(12) United States Patent
Roloff et al.

(10) Patent No.: US 8,798,996 B2
(45) Date of Patent: Aug. 5, 2014

(54) SPLITTING TERM LISTS RECOGNIZED FROM SPEECH

(75) Inventors: Jeffrey Roloff, San Jose, CA (US); Steven M. Horowitz, Los Altos, CA (US)

(73) Assignee: Coupons.com Incorporated, Mountain View, CA (US)

( * ) Notice: Subject to any disclaimer, the term of this patent is extended or adjusted under 35 U.S.C. 154(b) by 289 days.

(21) Appl. No.: 13/412,479

(22) Filed: Mar. 5, 2012

(65) Prior Publication Data
US 2013/0231918 A1 Sep. 5, 2013

(51) Int. Cl.
*G10L 15/18* (2013.01)
*G06F 17/27* (2006.01)
*G10L 15/26* (2006.01)

(52) U.S. Cl.
USPC .............................. 704/257; 704/9; 704/235

(58) Field of Classification Search
CPC ................................ G10L 15/04; G10L 15/05
See application file for complete search history.

(56) References Cited

U.S. PATENT DOCUMENTS

| | | | |
|---|---|---|---|
| 4,745,468 A | 5/1988 | Von Kohorn | |
| 4,876,592 A | 10/1989 | Von Kohorn | |
| 4,926,255 A | 5/1990 | Von Kohorn | |
| 5,034,807 A | 7/1991 | Von Kohorn | |
| 5,057,915 A | 10/1991 | Von Kohorn | |
| 5,128,752 A | 7/1992 | Von Kohorn | |
| 5,227,874 A | 7/1993 | Von Kohorn | |
| 5,249,044 A | 9/1993 | Von Kohorn | |
| 5,283,734 A | 2/1994 | Von Kohorn | |
| 5,368,129 A | 11/1994 | Von Kohorn | |
| 5,508,731 A | 4/1996 | Kohorn | |
| 5,697,844 A | 12/1997 | Von Kohorn | |
| 5,713,795 A | 2/1998 | Von Kohorn | |
| 5,759,101 A | 6/1998 | Von Kohorn | |
| 5,761,648 A | 6/1998 | Golden et al. | |
| 5,791,991 A | 8/1998 | Small | |
| 5,907,830 A | 5/1999 | Engel et al. | |
| 5,916,024 A | 6/1999 | Von Kohorn | |
| 6,321,208 B1 | 11/2001 | Barnett | |
| 6,336,099 B1 | 1/2002 | Barnett et al. | |
| 7,216,080 B2 * | 5/2007 | Tsiao et al. | 704/257 |
| 7,346,516 B2 * | 3/2008 | Sall et al. | 704/500 |
| 7,599,831 B2 * | 10/2009 | Ford | 704/9 |
| 7,640,240 B2 | 12/2009 | Boal et al. | |
| 7,664,638 B2 * | 2/2010 | Cooper et al. | 704/235 |
| 7,734,621 B2 | 6/2010 | Weitzman et al. | |
| 7,784,702 B2 | 8/2010 | Michels | |
| 7,962,931 B2 | 6/2011 | Bova | |
| 8,000,496 B2 | 8/2011 | Keswanie et al. | |
| 8,055,642 B2 | 11/2011 | Boal et al. | |
| 8,165,078 B2 | 4/2012 | Walsh et al. | |
| 8,254,535 B1 * | 8/2012 | Madhavapeddi et al. | 379/88.18 |

(Continued)

FOREIGN PATENT DOCUMENTS

AU  2006/294868  6/2011

*Primary Examiner* — Brian Albertalli

(57) ABSTRACT

In an embodiment, a method comprises analyzing a string of text that was generated based on audio input, identifying a plurality of text segments, wherein each text segment of the plurality of text segments comprises one or more words in the string of text, wherein at least one of the plurality of segments comprises a plurality of words, and organizing the plurality of text segments into a list of items, wherein each segment is a separate item in the list.

30 Claims, 3 Drawing Sheets

(56) References Cited

U.S. PATENT DOCUMENTS

| | | | |
|---|---|---|---|
| 8,412,525 B2* | 4/2013 | Mukerjee et al. | 704/254 |
| 2008/0159491 A1* | 7/2008 | Kelley et al. | 379/88.16 |
| 2009/0210233 A1* | 8/2009 | Thompson et al. | 704/275 |
| 2010/0305947 A1* | 12/2010 | Schwarz et al. | 704/252 |
| 2011/0288863 A1* | 11/2011 | Rasmussen | 704/235 |
| 2012/0035925 A1* | 2/2012 | Friend et al. | 704/235 |
| 2012/0290288 A1* | 11/2012 | Ait-Mokhtar | 704/9 |
| 2013/0103397 A1* | 4/2013 | Almaer et al. | 704/233 |

\* cited by examiner

SPLITTING TERM LISTS RECOGNIZED FROM SPEECH

TECHNICAL FIELD

Embodiments relate generally to speech-to-text and voice recognition.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Voice recognition is a process of translating voice input, speech or other sound into text. With the ubiquity of handheld computing devices that include voice recognition technology, more and more people rely on voice recognition to input text into various computer program applications, such texting applications, note-taking applications, searching applications, and to-do/reminder applications. The relatively small touch screens on many handheld devices makes voice recognition an even more attractive alternative to manually selecting characters when texting, searching, taking notes, or making lists.

Despite this apparent advantage, in some situations, voice recognition technology is more time consuming than manually entering text. For example, when attempting to create a grocery list, a user may (1) select a graphical voice recognition button, (2) speak a word or phrase, and (3) wait for the voice recognizer to display text that is based on the voice input. If the text is incorrect, then the user may repeat the same steps or manually enter the text. If the text is correct, then the user may (1) select a new row or input field into which a second item is to be displayed, (2) select the graphical voice recognition button, (3) speak a word or phrase, and (4) wait for the voice recognizer to display text corresponding to the second item. Many times, the delay between speaking the word or phrase and waiting for the voice recognizer to display text is longer than the time it would take to manually enter the word or phrase.

SUMMARY OF THE INVENTION

The appended claims serve to summarize the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
 1.0. General Overview
 2.0. Architectural Overview
  2.1 Client Device
  2.2 Network
  2.3 List Generator
 3.0. Splitting Process
  3.1 Locations Within Audio Data
  3.2 Delimiters Within Text String
  3.3 Key Phrases Within Text String
   3.3.1 Multiple Contexts
 4.0. Implementation Mechanism—Hardware Overview
 5.0. Extensions and Alternatives 1.0. General Overview In an embodiment, in a computing device a string of text is intelligently split into segments, where each segment comprises one or more words and the segments are organized into a list. A list generator may generate, from a text string, a list based on one or more criteria. Non-limiting examples of one or more criteria include pauses in the original audio data, specific delimiters identified in the audio data or in the text string, and a dictionary of phrases against which segments of the text string are compared. In this way, a list may be generated based on a single instance of voice input.

In other words, in one embodiment a user speaks a list of items to a computing device and the computing device may display a delimited list to the user without the user having to perform any other tasks (such as selecting a button or providing another type of input) from the end of the speaking until the display of the list. Embodiments may be used in real-time data processing as speech is received from a user, or with recorded or stored data files representing speech.

2.0. Architectural Overview

Figure 1:
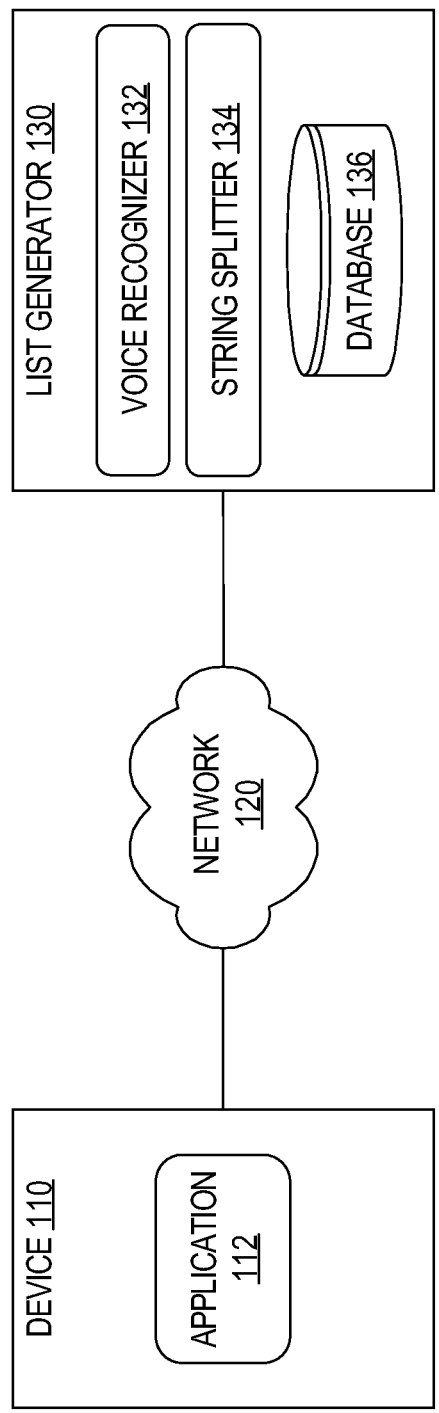
FIG. 1 is a block diagram that depicts an example system architecture for accepting voice input, performing voice recognition, and processing the text string that results from the voice recognition.

FIG. 1 is a block diagram that depicts an example computer system architecture 100 for accepting voice input, performing voice recognition, and processing the text string that is produced by the voice recognition. System architecture 100 includes computing device 110, computer network 120, and list generator 130.

2.1. Client Device

Figure 3:
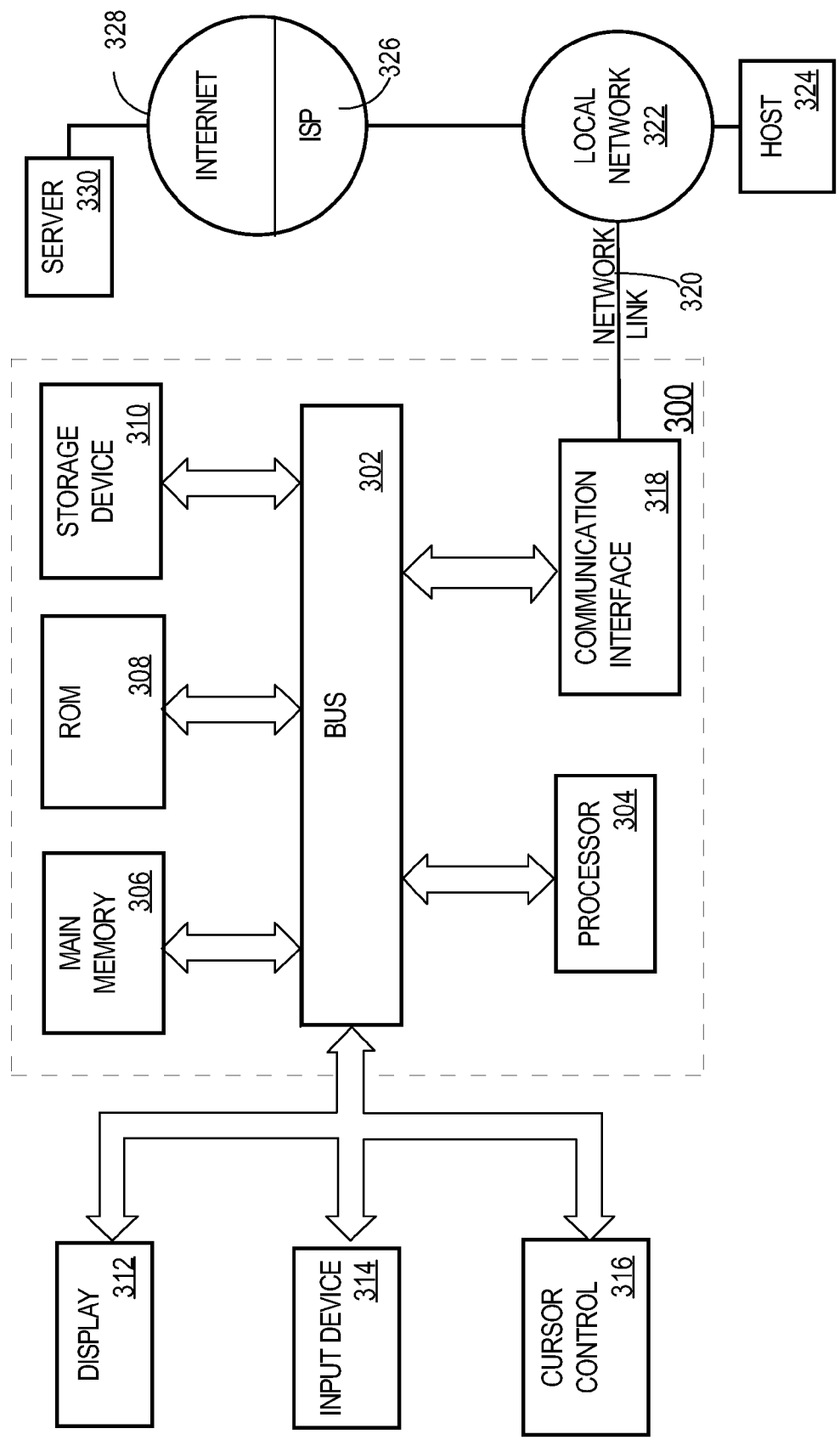
FIG. 3 is a block diagram of a computer system upon which embodiments may be implemented.

Device 110 is any computing device that is capable of receiving input from a user and displaying information about tasks. Non-limiting examples of device 110 include a desktop computer and a handheld device, such as a laptop computer, a tablet computer, and any phone with an Internet connection. The computing device 110 may be structured as shown in FIG. 3, which is described separately below. In the illustrated embodiment, device 110 includes a computer program application 112 that accepts and processes voice input. Application 112 may perform additional functions, such as managing a to-do list, a set of reminders, and/or a grocery list. The particular additional functions of the application 112 are not critical and embodiments may be used with a variety of additional functions.

Application 112 may be implemented in software, hardware, or any combination of software and hardware. Application 112 may be provided by the same entity or organization that maintains list generator 130. For example, a grocery service may develop and distribute application 112 and develop list generator 130 with which different instances of application 112 communicate.

Device 110 includes communication technology (for example, wireless technology) for sharing information with other devices. Device 110 may include a variety of integrated user interface units or can be coupled to user interface units through one or more communication ports or data links of the device. Non-limiting examples of user interface units include a voice input unit (for example, a microphone), physical input units (for example, a keyboard, a mouse, a track ball, a rotary dial or wheel, a touchpad, or a touch-screen), and motion sensors (for example, an accelerometer, magnetometer, or a gyroscope). Any of these user interface units can be implemented as an external unit that communicates with device 110 to provide user input using a wired or wireless communication technology. Examples of wired communication technology include Universal Serial Bus (USB) interface, FireWire interface, etc. Examples of wireless communication technology include Bluetooth, Wi-Fi, and WiMax, infrared. Through these user interface units, device 110 can receive physical or voice inputs from a user.

Device 110 includes one or more output units to present visual and, optionally, audio information to a user. Non-limiting examples of output units include a display unit for displaying visual data and a speaker for playing audio.

2.2. Network

Device 110 and list generator 130 may be communicatively coupled directly or indirectly using one or more data communications networks that are represented in FIG. 1 by network 120. Network 120 may be implemented by any medium or mechanism that provides for the exchange of data between various computing devices. Examples of such a network include, without limitation, a network such as a Local Area Network (LAN), Wide Area Network (WAN), internetwork, or one or more terrestrial, satellite, or wireless links. The network may include a combination of networks such as those described. The network may transmit data according to any of a variety of data communications protocols such as Transmission Control Protocol (TCP), User Datagram Protocol (UDP), and/or Internet Protocol (IP).

2.3. List Generator

List generator 130 accepts input from device 110 over network 120 and generates a list of one or more items. List generator 130 may be implemented by one or more computing devices. In the illustrated embodiment, list generator 130 comprises voice recognizer 132, string splitter 134, and database 136. In a related embodiment, the functionality of voice recognizer 132 and string splitter 134 is in a single component, such as a single software application or hardware component. Although not depicted in FIG. 1, list generator 130 may include additional functional components (whether hardware or software) and databases.

In an embodiment, voice recognizer 132 accepts audio data as input, performs an analysis of the audio data, and generates text based on the analysis. Voice recognizer 132 may be implemented in software, hardware, or any combination of hardware and software. Audio data may comprise live or recorded speech, sounds, or other audio information.

In an alternative embodiment, the functionality of voice recognizer 132 is performed on device 110 by application 112 or by another component (not shown) of device 110. In such an embodiment, device 110 sends the generated text to list generator 130.

In an alternative embodiment, the functionality of voice recognizer 132 is implemented by a device that is remote relative to device 110 (i.e., similar to list generator 130) and the functionality of string splitter 134 is implemented by application 112.

In an alternative embodiment, another component outside of both device 110 and list generator 130 performs the voice recognition on audio data generated from voice input. For example, list generator 130 receives the audio data from device 110 but passes the audio input to another device or system. List generator 130 then receives generated text from that other device or system. In a related example, device 110 sends the audio data directly to the other device or system, which generates the text string and sends the text string to list generator 130.

List generator 130 generates and stores a list in persistent storage and/or sends the list to device 110. For example, a user of device 110 may speak, "milk ham and cheese sandwich soda hot dogs and buns" and device 110 sends, over network 120 to list generator 130, audio data that reflects the voice input. List generator 130 generates the following list (where a comma (",") indicates a delimiter between determined items in the list): "milk, ham and cheese sandwich, soda, hot dogs, buns." List generator 130 may send the list over network to device 110. In response, application 112 reads the list and causes a display of device 110 to be updated to include the list. In various embodiments, items in the list may be visually or graphically separated in different ways; for example, in one approach the display includes the commas (",") or each item is on a separate horizontal line of a user interface.

For example, the display of device 110 may include different fields into which text may be entered, where each field corresponds to a different item of a yet-to-be-generated list. Alternatively, no fields may be displayed until some input is received from a user. Instead of the user manually selecting characters to be entered into one or more text fields, device 110 accepts voice input and generates audio data based on the voice input, application 112 sends the audio data to list generator 130, receives a list from list generator 130, and causes each field of multiple fields displayed on a screen of device 110 to be populated with the name of a different item from the list.

The following description includes numerous examples of list generator 130 analyzing text generated from audio data and generating a list based on that text. However, one or more of the techniques described herein may be implemented wholly on device 110 (making network 120 and list generator 130 unnecessary). Although there may be advantages for requiring device 110 to communicate over network 120 with list generator 130, in an alternative embodiment, list generator 130 is part of application 112 or part of device 110. Thus, application 112 may include voice recognizer 132 and/or string splitter 134 and access database 136. For example, application 112 may communicate with voice recognizer 132, which may operate as a separate application on device 110 and sends a text string to application 112 in response to receiving audio data from application 112. Application 112 may then call string splitter 134 to perform the splitting of the text string to generate a list. By including the components of list generator 130 on device 110, device 110 is not required to be connected to a network in order obtain a list of items based on audio input. Also, because all operations required to generate the list are performed on device 110, any network delay is avoided.

The following description also includes numerous examples of analyzing a string of text that was generated based on voice recognition. However, the string of text may have been generated in another manner, such as by a user manually selecting characters on a user interface display or on a physical keyboard.

3.0. Splitting Process

String splitter 134 splits or divides a text string into multiple segments based on one or more criteria. String splitter 134 may be implemented in software, hardware, or any combination of software and hardware.

In an embodiment, each segment comprises one or more words, where at least one of the segments comprises multiple words. Thus, merely identifying each word in a string does not "intelligently" divide the string. Non-limiting examples of the one or more criteria upon which the splitting is based include characteristics (for example, pauses or silence) identified in the voice data, one or more pre-defined delimiters identified in the text string, or one or more dictionaries or databases of pre-defined phrases. In this context, delimiters and phrases are "pre-defined" with respect to a text string if they are established prior to string splitter 134 analyzing a text string or prior to generating the text string.

3.1. Locations within Audio Data

In an embodiment, a text string is divided into multiple segments based on the location(s) of one or more characteristics identified in the audio data. Such characteristics may include a pause, a duration of relative silence, or a specific utterance or "stop word." Such locations may be identified by string splitter 134, voice recognizer 132, or another component, not shown, whether outside list generator 130 or a component thereof. For example, a user of device 110 may speak, "milk plus eggs plus macaroni and cheese plus bread." Voice recognizer 132 analyzes the audio data that device 110 generates based on the voice input and identifies each portion of the audio data that includes "plus." Voice recognizer 132 translates each non-plus word identified in the audio data and sends, to string splitter 134, text for each phrase that is delimited by "plus." String splitter 134 creates a list and adds an entry to the list for each phrase received from voice recognizer 132.

In a related example, voice recognizer 132 recognizes pauses or brief moments of relative silence in audio data that is generated based on voice input. The pauses or instances of silence act as segment delimiters, such as the stop word "plus." Voice recognizer 132 then translates each audio portion that is delimited by each pause or period of silence into a segment and sends each segment to string splitter 134.

3.2. Delimiters within Text String

In an embodiment, string splitter 134 receives a text string from voice recognizer 132 and identifies, within the text string, certain key words or delimiters, such as "plus," "next," or "new line." String splitter 134 creates an entry in a list for each segment in the text string that is separated by the pre-defined delimiter(s). For example, a user of device 110 may speak, "Chex cereal next item string cheese next item skim milk next item organic tomatoes next item squash next item Helen's pie crust." In this embodiment, as well as in the previous embodiment, the user knows the pre-defined delimiter(s), whether a word or phrase or a pause.

In the above examples, database 136 is not required. However, in the following examples, string splitter 134 uses database 136 and, optionally, one or more other databases of pre-defined phrases in order to group terms identified in a text string and create a list based on the grouping.

3.3. Keywords within Text String

Figure 2:
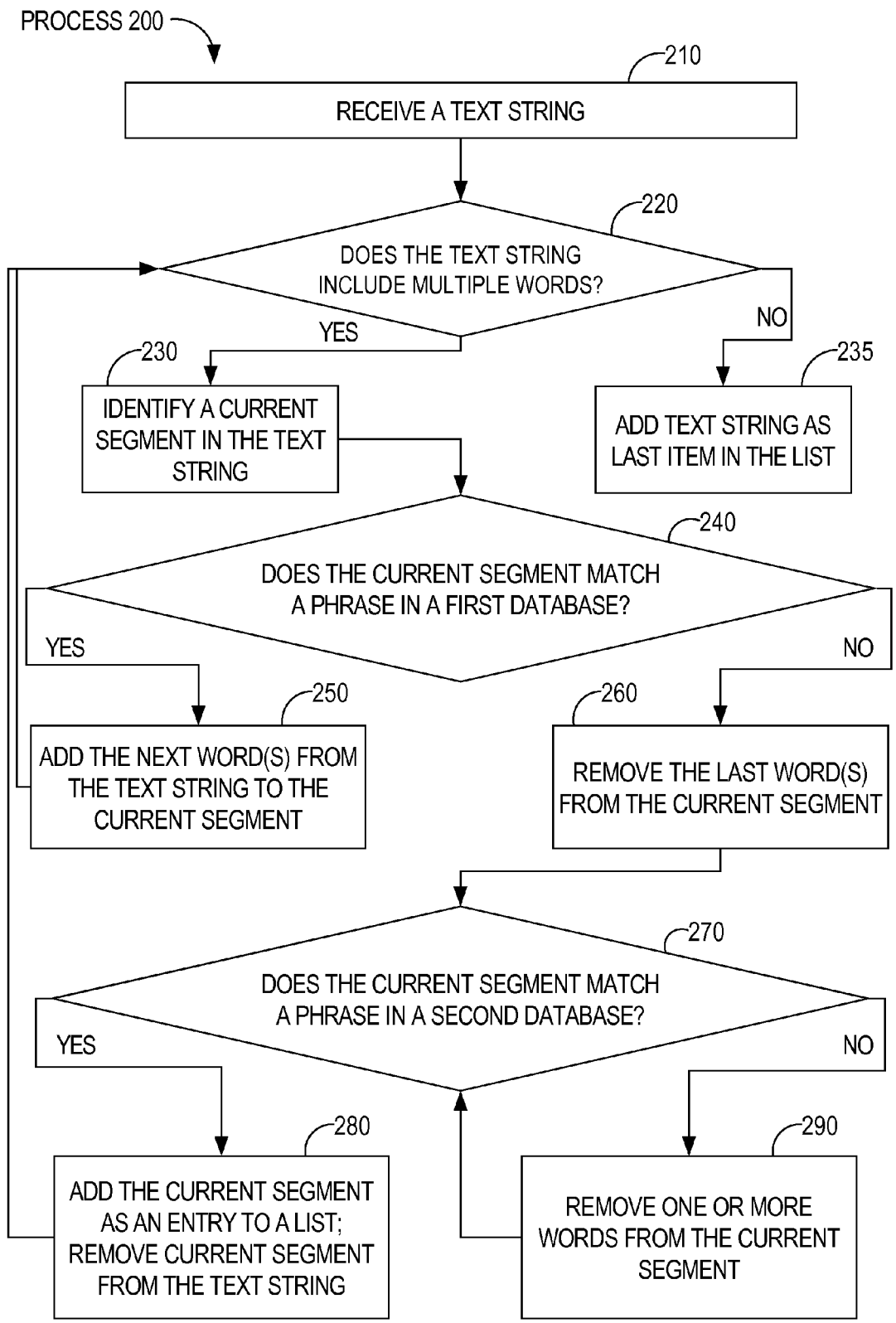
FIG. 2 is a flow diagram that depicts an example process for splitting a string of text that was recognized from speech.

FIG. 2 is a flow diagram that depicts a process 200 for splitting a string of text. Process 200 may be implemented by string splitter 134 of list generator 130. Alternatively, as indicated above, process 200 may be implemented on the same device that receives voice input from which the string of text is generated. Instead of relying on identifying delimiters in audio data or in a string of text in order to identify each item in a list, process 200 relies on one or more databases of pre-defined phrases or keywords that may match segments in a string of text.

At block 210, string splitter 134 receives a text string from voice recognizer 132.

At block 220, string splitter 134 determines whether there are two or more words in the text string. If so, process 200 proceeds to block 230.

At block 230, string splitter 134 identifies at least the first two words in the text string. The first two words in the text string act as the "current segment." If the second word in the text string is from a pre-defined set of "stop" words, such as "and" and "or", then, as part of block 230, string splitter 134 adds the third word in the text string to the current segment, since a segment ending in "and" and "or" is not likely to be an item that the user originally intended.

If, at block 220, string splitter 134 determines that there is only one word in the text string, then process 200 proceeds to block 235. At block 235, string splitter 134 adds the text string as an entry to a list. Arriving at block 235 indicates either (1) that the initial text string only comprises one word or (2) that, during subsequent blocks in process 200, one or more items (identified in the initial text string) have already been added to a particular list and the initial text string has since been modified.

At block 240, string splitter 134 searches database 136 based on the current segment. Database 136 comprises a set of pre-defined phrases. Embodiments of the invention are not limited to how the set of pre-defined phrases are organized in database 136. Database 136 may organize the set of pre-defined phrases as, for example, a linked list or separate rows in a table. In an embodiment, the set of pre-defined phrases correspond to actual products that include brand names. String splitter 134 compares the current segment with one or more phrases in database 136.

In an embodiment, the current segment "matches" a pre-defined phrase if the current segment is at least a subset of the pre-defined phrase. For example, the current segment of "macaroni and cheese" matches the pre-defined phrase "Alpha Macaroni and Cheese." As another example, the current segment of "cheese and macaroni" matches "Alpha Macaroni and Cheese" even though the order of the current segment does not match the order of any subset of the pre-defined phrase.

In a related embodiment, a "match" does not have to be a perfect match, as the order example above demonstrates. For example, the current segment may have a misspelling or non-alphanumeric characters that do not appear in database 136. However, string splitter 134 performs a "near" match search that attempts to, for example, correct any misspellings and/or ignore non-alphanumeric characters before performing a comparison against one or more pre-defined phrases in database 136. In addition or alternative to correcting misspellings, a "near" match may involve adding or removing one or more characters or words to the current segment or a pre-defined phrase before the comparison.

In a related embodiment, the current segment matches one or more phrases in database 136 if the current segment at least includes a word from a brand name or product name in the one or more phrases. For example, the current segment of "Beta eggs" may match the phrase "Bob Beta bacon and eggs big meal" that is found in database 136, even though the current segment does not include (a) "Bob" before "Beta" and (b) "bacon and" between "Beta" and "eggs."

If the current segment matches one or more phrases in the set of pre-defined phrases, then a positive result is returned to string splitter 134. If so, process 200 proceeds to block 250. Otherwise, process 200 proceeds to block 260. The positive result may be the names of actual products that include the current segment or some other another indication that a match was found (for example, returning a Boolean true value).

At block 250, string splitter 134 adds the next word from the text string to the end of the current segment. For example, if the current segment is "Bob Beta" and the next word, from the text string, that follows "Bob Beta" is "bacon", then "bacon" is added to "Bob Beta", in which case the current segment becomes "Bob Beta bacon." Thus, the current segment becomes the modified current segment and process 200 proceeds to block 230.

As another example, if the current segment is "Gamma macaroni" and the next word, from the text string, is a stop word, such as "and", then the following word from the text string is also identified. In this example, the word that follows "and" is "cheese". Thus, "and cheese" is added to "Gamma macaroni", in which case the current segment becomes "Gamma macaroni and cheese."

At block 260 (which means no matches were found in block 230), the current segment is modified by removing the last word(s) that was added to the current segment. For example, if the current segment is "macaroni and cheese bananas", then "bananas" is removed from the current segment and the current segment becomes "macaroni and cheese." The modified current segment becomes the current segment and process 200 proceeds to block 270. In an alternative embodiment, process 200 ends instead of proceeding to block 270. In such an embodiment, there is only a single database (i.e., database 136) of pre-defined phrases.

At block 270, string splitter 134 searches a second database (not depicted) based on the current segment to determine whether the current segment matches a phrase in the second database. In an embodiment, the second database includes a set of pre-defined generic products, such as "milk", "bacon", and "macaroni and cheese." Thus, in this embodiment, the items identified in database 136 are specific types of products that are mentioned in the second database. For example, there might be 20 different bacon products and 5 different bacon brands identified in database 136 while the only items in the second database with "bacon" in their title might be "bacon" and "bacon bits."

Although database 136 and the second database are referred to as different databases, each database may be stored on the same storage device, which may comprise volatile media or non-volatile media.

In some instances, a user may speak multiple product names that appear in a single phrase in product database 136, but where the user intended the series of words to be separate items in a resulting list. For example, the current segment of "bacon and eggs" may not match a phrase in the second database even though one or more phrases in database 136 may include that phrase, such as "Bob Beta bacon and eggs big meal". However, the user that uttered "bacon and eggs" probably desired two items in the resulting list, each item corresponding to a different generic product rather than a single item that identifies "Bob Beta bacon and eggs big meal." Because generic product names may have multiple words in them and there is desire to capture the longest possible names, the second half of process 200 (i.e., blocks 270-290) starts with the full set of terms found in the first half of process 200 (i.e., blocks 220-260) and, if needed, removes words from the end until an item in another database is found. Thus, the longest-named generic item that starts with the words found in blocks 220-260 is captured (if such a generic exists). Because the second database does not contain a "bacon and eggs" generic item, but does contain a "bacon" generic item, this example would cause "bacon" to be (a) added as an item to a list and (b) stripped from the text string.

In an embodiment, a "match" between the current segment and a phrase found in the second database must be an exact match instead of a "near" match. Therefore, in an embodiment, the standard of whether the current segment matches a pre-defined phrase in database 136 is different than the standard of whether the current segment matches a pre-defined phrase in the second database.

If a match is found in the second database, then process 200 proceeds to block 280. Otherwise, process 200 proceeds to block 290.

At block 280, string splitter 134 adds the current segment as a single item to a list. For example, if the current segment is "macaroni and cheese", then an item with the name of "macaroni and cheese" is added as a single item to a list. If the current segment is "bacon", then an item with the name of "bacon" is added to the list. Adding an item to a list may involve, for example, adding a row to a table, adding an entry to a linked list of one or more entries, or causing a display of the list to be updated to include the name of the item.

In an embodiment, string splitter 134 performs a duplication check before adding an item to an existing list. In other words, string splitter 134 determines whether the list includes an item with the same name as the current segment. If so, then string splitter 134 does not add, to the list, a new item that refers to the current segment. In this way, even though a user may say "milk" multiple times while only intending to purchase one item of milk, then "milk" will only appear in the list once. In a related embodiment, string splitter 134 adds an indication to the item in the list that has the same name as the current segment. For example, in the list, "milk" may become "milk$^2$" or "milk$_2$" which informs the user that s/he said "milk" twice.

Also, as part of block 280, string splitter 134 removes, from the text string, the words that correspond to the current segment. Process 200 proceeds to block 220 where the text string that is analyzed is the modified text string generated in block 280.

At block 290, string splitter 134 removes the last word in the current segment. For example, the current segment may be "bacon and eggs" and no match was found in the second (for example, generic product) database. After removing "eggs", the current segment becomes "bacon and." In an embodiment, string splitter 134, when removing words from the current segment, also removes certain pre-defined words, such as "and" and "or" since such words will not likely match any phrases in the second database. Therefore, string splitter 134, in this example, may remove "and eggs" from "bacon and eggs" resulting in a current segment of "bacon." Process 200 then proceeds to block 270.

In an embodiment, if block 290 begins with the current segment only comprising one word, then, instead of removing that word from the current segment, the search result(s) that were identified in the last iteration of block 240 that resulted in the affirmative are added to the list. For example, if the current segment is "Beta", the original text string comprises "broccoli Beta bacon milk cereal" and a previous segment "Beta bacon" matched "Bob Beta bacon and eggs big meal" in the last iteration of block 240, then the full product name (i.e., "Bob Beta bacon and eggs big meal") is added to the list. Alternatively, a shortened product name could be added to the list, such as the phrase (for example, "Beta bacon") that is found in the original text string.

3.3.1 Multiple Contexts

Prior examples relate to the grocery context where a user may be interested in two types of grocery items: specific grocery items (including brand names) (for example, "Gamma butter") and generic grocery items (for example, "milk" and "cheese") where the specific brand is not important to the user. In this grocery context, database 136 stores a set of phrases that identify specific grocery items and the second database stores a set of phrases that identify generic grocery items.

In other contexts, a user may be interested in three or more types of items or in a single type of item. In the former case, three or more databases of pre-defined phrases may be maintained, one database for each type; while in the latter case, only a single database is sufficient. Thus, in one of those contexts, process 200 would be modified such that string splitter 134 utilizes either three or more databases or only a single database.

In an embodiment, string splitter 134 (or another component of list generator 130) determines, from among multiple contexts, a particular context in which to analyze a text string. Each context of the multiple contexts is associated with a different set of one or more databases. For example, context 1 is associated with databases A and B, context 2 is associated with database C, D, E and context 3 is associated with databases B, C, and F. Context 1 may be a grocery context, content 2 may be a music context (for example, when creating a music list), and context 3 may be a party planning context (for example, where the user may be interested in generic food items, party decorations, and music). In other words, the context in which a user provides voice input dictates which database(s) are accessed when grouping terms in a text string and, optionally, what specific steps are performed in order to generate a list based on the text string.

The determination of which context is applicable when analyzing a text string may be performed in numerous ways. For example, application 112 may send, to list generator 130, context data that identifies a particular context. As another example, list generator 130 may determine the context based on the type of application 112 (for example, a grocery application or a music application) or the identity (for example, IP address, MAC address) of device 110.

4.0. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 300. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (for example, x) and a second axis (for example, y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process blocks described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 may transmit a requested code for an application program through Internet 328, ISP 326, local network 322 and communication interface 318. The received code may be executed by processor 304 as it is received, and/or stored in storage device 310, or other non-volatile storage for later execution.

5.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    determining a first context from among a plurality of contexts;
    based on the first context, identifying a first technique for analyzing text data, wherein each context of the plurality of contexts is associated with a different technique for analyzing text data;
    using the first technique to analyze a string of text that was generated based on audio data;
    wherein using the first technique comprises identifying a plurality of text segments based on one or more criteria, wherein each segment of the plurality of text segments comprises one or more words in the string of text, wherein at least one text segment of the plurality of text segments comprises a plurality of words;
    organizing the plurality of text segments into a list of items, wherein each text segment is a separate item in the list;
    wherein the method is performed by one or more computing devices.

2. The method of claim 1, further comprising causing the list to be displayed on a computer display device.

3. The method of claim 1, further comprising, prior to analyzing the string, analyzing the audio data to generate the string of text.

4. The method of claim 1, wherein:
    analyzing the string of text comprises identifying one or more pre-defined text within the string of text;
    identifying the plurality of text segments is performed based on the location of the one or more pre-defined text within the string of text;
    each text segment of the plurality of text segments is delineated based on the one or more pre-defined text.

5. The method of claim 1, further comprising:
    based on one or more second criteria, identifying a plurality of locations within the audio input;
    wherein identifying the plurality of text segments is based on the plurality of locations.

6. The method of claim 5, wherein identifying the plurality of locations is based on a length of a pause identified in the audio input.

7. The method of claim 1, wherein identifying the plurality of text segments comprises identifying the plurality of text segments based on a database of phrases, wherein each phrase in the database comprises one or more words.

8. The method of claim 1, wherein the first technique is associated with a first set of one or more database of phrases and a second technique that is associated with a second context of the plurality of contexts involves a second set of one or more databases that is different than the first set of one or more database.

9. The method of claim 1, wherein determining the first context comprises determining the first context based on (a) a client device that displays the list of items or (b) an application that receives the audio data from which the string of text is generated.

10. A method comprising:
    analyzing a string of text that was generated based on audio data;
    based on one or more criteria, identifying a plurality of text segments based on a database of phrases, wherein each phrase in the database of phrases comprises one or more words, wherein each segment of the plurality of text segments comprises one or more words in the string of text, wherein at least one text segment of the plurality of text segments comprises a plurality of words;
    wherein identifying the plurality of text segments comprises:
        identifying a first segment in the string of text;
        determining whether the first segment matches a phrase in the database of phrases;

in response to determining that the first segment matches a particular phrase in the database of phrases:
identifying, in the string of text, a word that follows, in the string of text, the last word in the first segment,
adding the word to the first segment to generate a second segment, and
determining whether the second segment matches a phrase in the database of phrases;
wherein the method is performed by one or more computing devices.

11. The method of claim 10, wherein the first segment does not exactly match the particular phrase.

12. The method of claim 10, wherein:
the database of phrases is a first database of phrases;
the method further comprising, in response to determining that the second segment does not match any phrase in the first database of phrases, determining whether the first segment matches any phrase in a second database of phrases that is separate than the first database of phrases; and
each phrase in the second database of phrases comprises one or more words.

13. The method of claim 12, wherein:
the first database of phrases comprises an identification of a plurality of brand names; and
the second database of phrases comprises an identification of a plurality of generic items.

14. The method of claim 12, further comprising, in response to determining that the first segment does not match any phrase in the second database of phrases:
removing a word from the first segment to generate a third segment of one or more words;
determining whether the third segment matches a phrase in the second database of phrases.

15. The method of claim 12, wherein the first segment must exactly match a phrase in the second database of phrases in order for the first segment to match a phrase in the second database of phrases.

16. One or more storage media storing instructions which, when executed by one or more processors, cause:
determining a first context from among a plurality of contexts;
based on the first context, identifying a first technique for analyzing text data, wherein each context of the plurality of contexts is associated with a different technique for analyzing text data;
using the first technique to analyze a string of text that was generated based on audio data;
wherein using the first technique comprises identifying a plurality of text segments based on one or more criteria, wherein each segment of the plurality of text segments comprises one or more words in the string of text, wherein at least one text segment of the plurality of text segments comprises a plurality of words;
organizing the plurality of text segments into a list of items, wherein each text segment is a separate item in the list.

17. The one or more storage media of claim 16, wherein the instructions, when executed by the one or more processors, further cause causing the list to be displayed on a computer display device.

18. The one or more storage media of claim 16, wherein the instructions, when executed by the one or more processors, further cause, prior to analyzing the string, analyzing the audio data to generate the string of text.

19. The one or more storage media of claim 16, wherein:
analyzing the string of text comprises identifying one or more pre-defined text within the string of text;
identifying the plurality of text segments is performed based on the location of the one or more pre-defined text within the string of text;
each text segment of the plurality of text segments is delineated based on the one or more pre-defined text.

20. The one or more storage media of claim 16, wherein the instructions, when executed by one or more processors, further cause:
based on one or more criteria, identifying a plurality of locations within the audio input;
wherein identifying the plurality of text segments is based on the plurality of locations.

21. The one or more storage media of claim 20, wherein identifying the plurality of locations is based on a length of a pause identified in the audio input.

22. The one or more storage media of claim 16, wherein identifying the plurality of text segments comprises identifying the plurality of text segments based on a database of phrases, wherein each phrase in the database comprises one or more words.

23. The one or more storage media of claim 16, wherein the first technique is associated with a first set of one or more database of phrases and a second technique that is associated with a second context of the plurality of contexts involves a second set of one or more databases that is different than the first set of one or more database.

24. The one or more storage media of claim 16, wherein determining the first context comprises determining the first context based on (a) a client device that displays the list of items or (b) an application that receives the audio data from which the string of text is generated.

25. One or more storage media storing instructions which, when executed by one or more processors, cause:
analyzing a string of text that was generated based on audio data;
based on one or more criteria, identifying a plurality of text segments based on a database of phrases, wherein each phrase in the database of phrases comprises one or more words, wherein each segment of the plurality of text segments comprises one or more words in the string of text, wherein at least one text segment of the plurality of text segments comprises a plurality of words;
wherein identifying the plurality of text segments comprises:
identifying a first segment in the string of text;
determining whether the first segment matches a phrase in the database of phrases;
in response to determining that the first segment matches a particular phrase in the database of phrases:
identifying, in the string of text, a word that follows, in the string of text, the last word in the first segment,
adding the word to the first segment to generate a second segment, and
determining whether the second segment matches a phrase in the database of phrases.

26. The one or more storage media of claim 25, wherein the first segment does not exactly match the particular phrase.

27. The one or more storage media of claim 25, wherein:
the database of phrases is a first database of phrases;
the method further comprising, in response to determining that the second segment does not match any phrase in the first database of phrases, determining whether the first segment matches any phrase in a second database of phrases that is separate than the first database of phrases; and
each phrase in the second database of phrases comprises one or more words.

28. The one or more storage media of claim 27, wherein:
the first database of phrases comprises an identification of a plurality of brand names; and
the second database of phrases comprises an identification of a plurality of generic items.

29. The one or more storage media of claim 27, wherein the instructions, when executed by one or more processors, further cause, in response to determining that the first segment does not match any phrase in the second database of phrases:
removing a word from the first segment to generate a third segment of one or more words;
determining whether the third segment matches a phrase in the second database of phrases.

30. The one or more storage media of claim 27, wherein the first segment must exactly match a phrase in the second database of phrases in order for the first segment to match a phrase in the second database of phrases.

* * * * *